United States Patent
Inoue

(10) Patent No.: US 10,831,301 B2
(45) Date of Patent: Nov. 10, 2020

(54) PRESSURE DETECTING AND INFORMATION INPUT DEVICE TO AMPLIFY AN OUTPUT

(71) Applicant: NISSHA CO., LTD., Kyoto (JP)

(72) Inventor: Atsuo Inoue, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 16/609,665

(22) PCT Filed: May 16, 2018

(86) PCT No.: PCT/JP2018/018958
§ 371 (c)(1),
(2) Date: Oct. 30, 2019

(87) PCT Pub. No.: WO2018/230236
PCT Pub. Date: Dec. 20, 2018

(65) Prior Publication Data
US 2020/0150845 A1 May 14, 2020

(30) Foreign Application Priority Data
Jun. 15, 2017 (JP) ................................ 2017-118130

(51) Int. Cl.
*G06F 3/041* (2006.01)
(52) U.S. Cl.
CPC ........ *G06F 3/04146* (2019.05); *G06F 3/0416* (2013.01); *G06F 3/04142* (2019.05); *G06F 2203/04105* (2013.01)
(58) Field of Classification Search
CPC ........................................ G06F 3/0414–04146
See application file for complete search history.

(56) References Cited

U.S. PATENT DOCUMENTS

| 8,564,735 B2 | 10/2013 | Nakayama et al. |
| 2015/0370385 A1* | 12/2015 | Yamaguchi ......... G06F 3/04186 345/174 |
| 2017/0068376 A1 | 3/2017 | Kim et al. |

FOREIGN PATENT DOCUMENTS

| JP | 2012177798 A | 9/2012 |
| JP | 2013113760 A | 6/2013 |

(Continued)

OTHER PUBLICATIONS

International Search Report PCT/JP2018/018958 dated Jul. 31, 2018 (pp. 1-3).

*Primary Examiner* — Laurence J Lee
(74) *Attorney, Agent, or Firm* — Millen, White, Zelano & Branigan, P.C.; William Nixon

(57) ABSTRACT

A pressure detection device includes a pressure sensitive sensor and a pressure calculating unit. The pressure sensitive sensor includes an upper base substrate, a lower base substrate, and a pressure sensitive layer formed on a surface of one of the base substrates. The pressure sensitive layer includes a pair of pressure sensitive portions located symmetrically with respect to a plane center. A first elastic body and a second elastic body are disposed at a position to which a pressing force is applied. A first electrode and a second electrode are disposed with the pressure sensitive layer. The pressure calculating unit is configured to cause the pressure sensitive sensor to detect a pressure change for each of the pair of pressure sensitive portions and to add a sign-reversed pressure change in a pressure sensitive portion to a pressure change in the other pressure sensitive portion to amplify an output.

20 Claims, 15 Drawing Sheets

(56) References Cited

FOREIGN PATENT DOCUMENTS

| | | |
|---|---|---|
| JP | 2015035132 A | 2/2015 |
| JP | 2017083942 A | 5/2017 |
| WO | 16208560 A1 | 12/2016 |

* cited by examiner

PRESSURE DETECTING AND INFORMATION INPUT DEVICE TO AMPLIFY AN OUTPUT

CROSS REFERENCES TO RELATED APPLICATIONS

This application is a continuation of International Application No. PCT/JP2018/018958, filed on May 16, 2018, which claims priority to Japanese Patent Application 2017-118130, filed on Jun. 15, 2017, which is incorporated herein by reference.

TECHNICAL FIELD

The present disclosure relates to a pressure detection device and an information input apparatus using the same.

BACKGROUND

Conventionally, an information input apparatus integrally provided with a display device and an input device is known. The display device is, for example, a liquid crystal panel. The input device is, for example, a touch sensor. There is a case that the input device further includes a pressure sensitive sensor that can detect a pressing force.

A touch input device includes a touch sensor panel, a display module, and a pressure detection module.

SUMMARY

Technical Problem

In the touch input device described above, the pressure detection module is provided between a peripheral edge portion of the display module and the base plate.

Unfortunately, the information input apparatus in a mobile terminal such as a smart phone in recent years includes a display device the peripheral edge portion of which has a narrow width. This makes it difficult to dispose a pressure detection unit on the edge portion of the display device. Meanwhile, the pressure detection unit is possibly provided at the center of the display device in a state overlapped with the display unit. However, in a case where the pressure detection unit partially corresponds to the display device, a pressure is applied to a part of the display device from the pressure detection unit, resulting in a distortion in the image, which is referred to as pooling.

Under such a circumstance, the pressure detection unit is possibly provided corresponding to the entirety of the display device; however, the output of the pressure sensitive sensor becomes insufficient depending on the configuration of the information input device, which leads to inadequate sensitivity.

Moreover, in a case where the pressure detection unit is provided in a state overlapped with the display unit of the display device, the initial load for the pressure sensitive sensor does not occur until the display device is bonded to the chassis. In other words, the pressure detection performance of the pressure sensitive sensor can be accurately perceived only after the assembling of the display device.

An object of the present disclosure is to enhance the sensitivity of a pressure sensitive sensor provided corresponding to the entire surface of a display device of an information input apparatus.

Solution to Problem

Some aspects are described below as the means to solve the problems. These aspects can be combined optionally, as needed.

A pressure detection device according to one aspect of the present disclosure includes a pressure sensitive sensor, a touch sensor, and a pressure detection control unit.

The pressure sensitive sensor includes a first insulating layer, a second insulating layer disposed facing the first insulating layer, a sensor member formed on a surface of at least one of the first insulating layer and the second insulating layer, the sensor member including a pair of pressure sensitive portions located symmetrically with respect to a plane center, an elastic member disposed at a position to which a pressing force is applied, and a drive electrode and a sense electrode disposed with the sensor member interposed between the drive electrode and the sense electrode.

The pressure detection control unit is configured to execute a step of causing the pressure sensitive sensor to detect a pressure change for each of the pair of pressure sensitive portions and a step of adding a sign-reversed pressure change of one of the pair of pressure sensitive portions to a pressure change of the other of the pair of pressure sensitive portions to amplify an output.

The pressure detection device has the increased output, that is, the enhanced sensitivity.

The pair of pressure sensitive portions may have the same area and the same shape.

The pressure detection device has the increased output, that is, the enhanced sensitivity.

The pressure sensitive sensor may include a rectangular-shaped plane.

The pair of pressure sensitive portions may be provided corresponding to two sides of the pressure sensitive sensor.

The pressure detection device has the increased output, that is, the enhanced sensitivity.

The pressure detection device may further include elastic members disposed side by side in a pressing direction with respect to the pressure sensitive portion.

The sensor member may be configured to change in resistance in a case that a pressing force applied to the pressure sensitive sensor changes.

The sensor member may be an elastic member and may include an elastic member the electrostatic capacitance of which changes in a case that a pressing force applied to the pressure sensitive sensor changes.

An information input apparatus according to another aspect of the present disclosure includes a touch panel, a display device, an optical film group, the pressure detection device described above, a support plate, and a support.

The touch panel is configured to detect touch coordinates.

The support plate is disposed such that the optical film group and the pressure sensitive sensor are interposed between the support plate and the display device.

The support constitutes a sensor structure by coupling the display device and the support plate and enclosing the optical film group and the pressure sensitive sensor between the display device and a sheet metal.

In this device, the initial load for the sensor structure can be set before the completion of the assembling of the information input apparatus. This facilitates the manufacture of the sensor structure.

The pressure detection control unit may be configured to add a sign-reversed pressure change detected by a pressure sensitive portion farther from the touch coordinates of the pair of pressure sensitive portions to a pressure change detected by a pressure sensitive portion closer to the touch coordinates of the pair of pressure sensitive portions to amplify an output.

The pressure detection device has the increased output, that is, the enhanced sensitivity.

The information input apparatus may further include a chassis having a bottom portion and a side portion that form a recessed portion having an opening.

An edge portion closer to the opening of the side portion may support the sensor structure.

The recessed portion may house the sensor structure.

A gap may be reserved between the bottom portion and the support plate.

In this device, in a case that a pressing force is applied to the display device, the pressure sensitive sensor is compressed between the display device and the support plate. This allows the pressing force to be detected. At this time, the support plate elastically deforms in the gap between the support plate and the bottom portion in accordance with the pressing force.

In this device, the initial load at the sensor structure can be set before the sensor structure is attached to the chassis and before the completion of the manufacture of the device. This facilitates the manufacture of the sensor structure.

An information input apparatus according to still another aspect of the present disclosure includes a touch panel, a display device, an optical film group, a pressure sensitive sensor, a support plate, a support, and a chassis.

The support plate is disposed such that the optical film group and the pressure sensitive sensor are interposed between the support plate and the display device.

The support constitutes a sensor structure by coupling the display device and the support plate and enclosing the optical film group and the pressure sensitive sensor.

The chassis includes a bottom portion and a side portion that form a recessed portion.

An edge surface closer to the opening of the side portion supports the sensor structure.

The recessed portion houses the sensor structure.

A gap is reserved between the bottom portion and the support plate.

In this device, in a case that a pressing force is applied to the display device, the pressure sensitive sensor is compressed between the display device and the support plate. This allows the pressing force to be detected. At this time, the support plate elastically deforms in the gap between the support plate and the bottom portion in accordance with the pressing force.

In this device, the initial load at the sensor structure can be set before the sensor structure is attached to the chassis and before the completion of the manufacture of the device. This facilitates the manufacture of the sensor structure.

The pressure detection device according to the present disclosure has enhanced sensitivity even in a case where the pressure sensitive sensor is provided corresponding to the entire surface of a display device.

DETAILED DESCRIPTION

1. First Embodiment

(1) Overall Configuration of Information Input Apparatus

Figure 1:
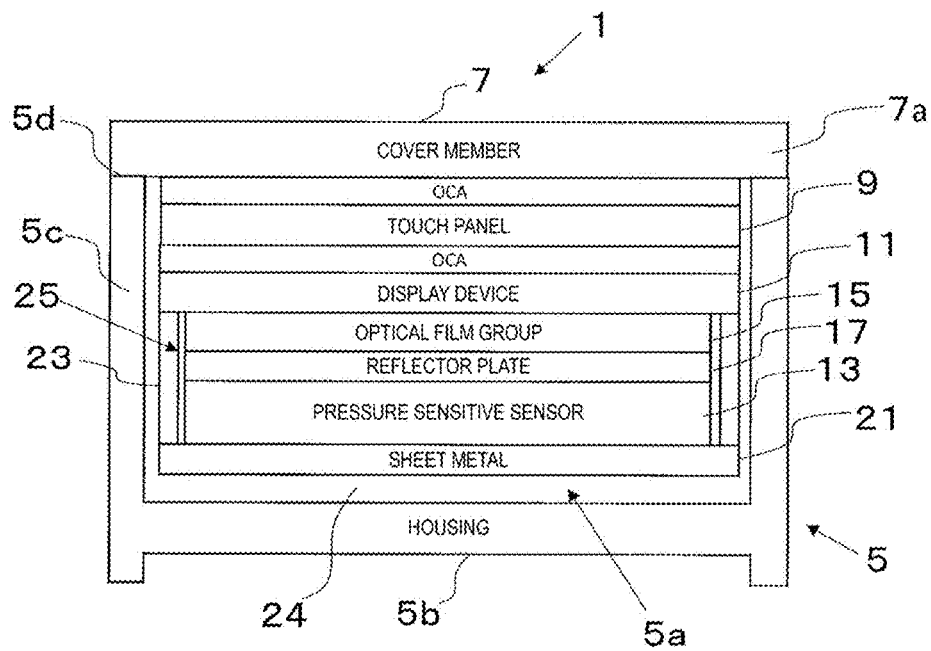
FIG. 1 is a cross-sectional view schematically illustrating an information input apparatus according to a first embodiment of the present disclosure.

An information input apparatus 1 will be described with reference to FIG. 1. FIG. 1 is a cross-sectional view schematically illustrating an information input apparatus according to the first embodiment of the present disclosure.

The information input apparatus 1 is a device configured to allow information to be input with a contact operation by the operator. The information input apparatus 1 is a display-integrated input device having a function of a display device as well as a function of an input device and is, for example, an electronic apparatus such as a smart phone, a tablet-type computer, and a smart watch.

The information input apparatus 1 includes a housing (which is an example of the chassis) 5. The housing 5 is formed of a material with high rigidity and is made of metal such as aluminum or titanium; or plastic. The housing 5 has a boxed shape. The housing 5 includes a recessed portion 5a. The recessed portion 5a opens upward. The recessed portion 5a includes a bottom portion 5b and a side portion 5c formed around the bottom portion 5b.

The information input apparatus 1 includes a cover member 7. The cover member 7 constitutes an operation surface for receiving a pressing operation by the operator. The cover member 7 is made of a light-transmissive material having relatively high rigidity. The cover member 7 can be glass, polymethyl methacrylate (PMMA), polycarbonate (PC), or the like. The cover member 7 has a shape and position corresponding to the recessed portion 5a of the housing 5 and is disposed covering the opening of the recessed portion 5a. Specifically, the cover member 7 includes an edge portion 7a supported by the side portion 5c of the housing 5, where in a case that a pressing force is applied to the cover member 7 from the upper side in FIG. 1, the side portion 5c of the housing 5 receives the load from the cover member 7. The thickness of the cover member 7 ranges from 0.1 to 10 mm.

The information input apparatus 1 includes a touch panel 9. The touch panel 9 is fixed to the lower side surface of the cover member 7 by an adhesive (OCA). The touch panel 9 is resistive, capacitive, or another type of touch panel.

The information input apparatus 1 includes a display device 11. The display device 11 is fixed to a lower surface of the touch panel 9 by an adhesive (OCA). The display device 11 is a liquid crystal panel, an organic EL panel, or the others.

The information input apparatus 1 includes a pressure sensitive sensor 13. The pressure sensitive sensor 13 is a sensor that generates a detection signal in a case that a pressing force is applied. The pressure sensitive sensor 13 is provided beneath the touch panel 9 and the display device 11. The pressure sensitive sensor 13 has a shape corresponding to substantially the entire surface of the touch panel 9 and the display device 11, in a plan view.

The information input apparatus 1 includes an optical film group 15. The optical film group 15 is provided on a lower surface of the display device 11.

The information input apparatus 1 includes a reflector plate 17. The reflector plate 17 is provided between a lower surface of the optical film group 15 and an upper surface of the pressure sensitive sensor 13. The reflector plate 17 is formed of, for example, aluminum or tin and is coated by vapor deposition, sputtering, and coating.

The information input apparatus 1 includes a sheet metal 21 (which is an example of the support plate) and a support 23 as a structure for fixing the pressure sensitive sensor 13 to the touch panel 9 and the display device 11. The sheet metal 21 is disposed on a lower surface of the pressure sensitive sensor 13. A gap 24 is reserved between the sheet metal 21 and the bottom portion 5b of the recessed portion 5a of the housing 5. The support 23 is a member that extends in the vertical direction and fixes an outer peripheral edge of the sheet metal 21 to an outer peripheral edge of the display device 11.

As described above, a sensor structure 25 is achieved, in which the support 23 allows the optical film group 15, the reflector plate 17, and the pressure sensitive sensor 13 to be interposed between the touch panel 9 and the display device 11; and the sheet metal 21. The sensor structure 25 is supported by the edge portion 5d closer to the opening of the side portion 5c of the housing 5 with the touch panel 9 and the cover member 7. The sensor structure 25 is housed in the recessed portion 5a.

As described above, the sensor structure 25 is achieved by the support 23 and the sheet metal 21. This allows the initial load for the pressure sensitive sensor 13 in the sensor structure 25 to be set before the completion of the assembling of the information input apparatus 1. This facilitates the manufacture of the sensor structure 25.

In the information input apparatus 1, in a case that the cover member 7 is pressed to apply a pressing force to the display device 11, the pressure sensitive sensor 13 receives a load from the touch panel 9 and the display device 11 and is compressed between the display device 11 and the sheet metal 21. This allows the pressing force to be detected. Moreover, at this time, the sheet metal 21 elastically deforms between the sensor structure 25 and the bottom portion 5b in accordance with the pressing force. Specifically, the entirety of the sheet metal 21 deforms in the pressing direction, and the amount of compression at the portion inward from the peripheral edge portion increases. Moreover, the portion of the sheet metal 21 corresponding to the pressing point partially protrudes in the pressing direction.

(2) Pressure Sensitive Sensor

Figure 2:
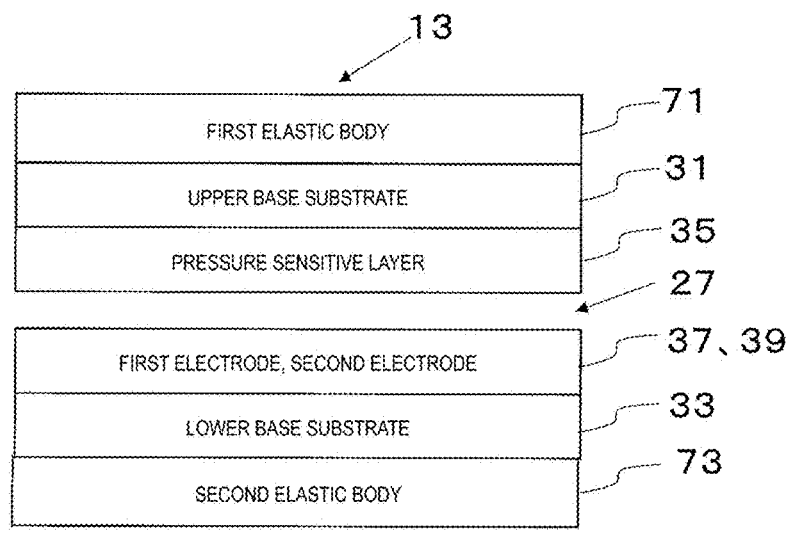
FIG. 2 is a cross-sectional view schematically illustrating a resistive-type pressure sensitive sensor.
Figure 3:
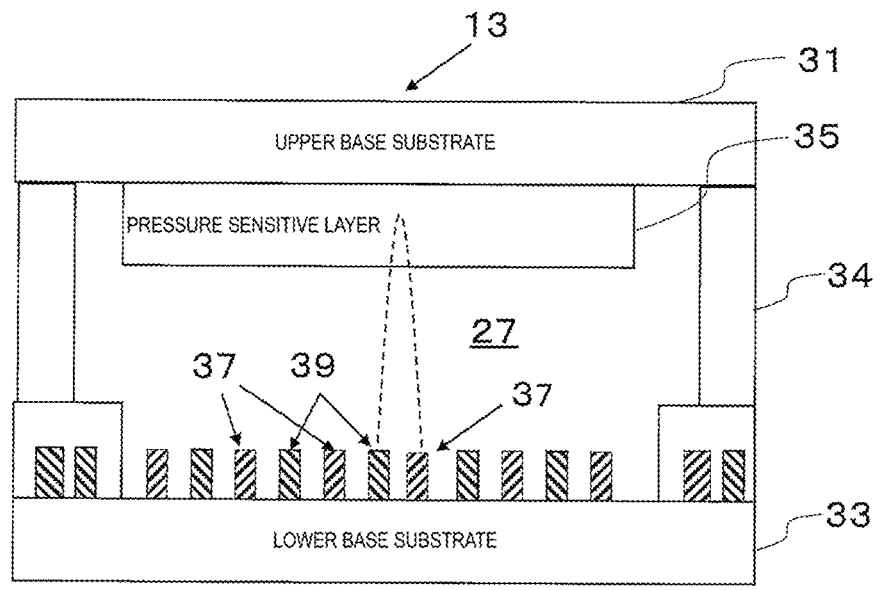
FIG. 3 is a cross-sectional view specifically illustrating a resistive-type pressure sensitive sensor.
Figure 4:
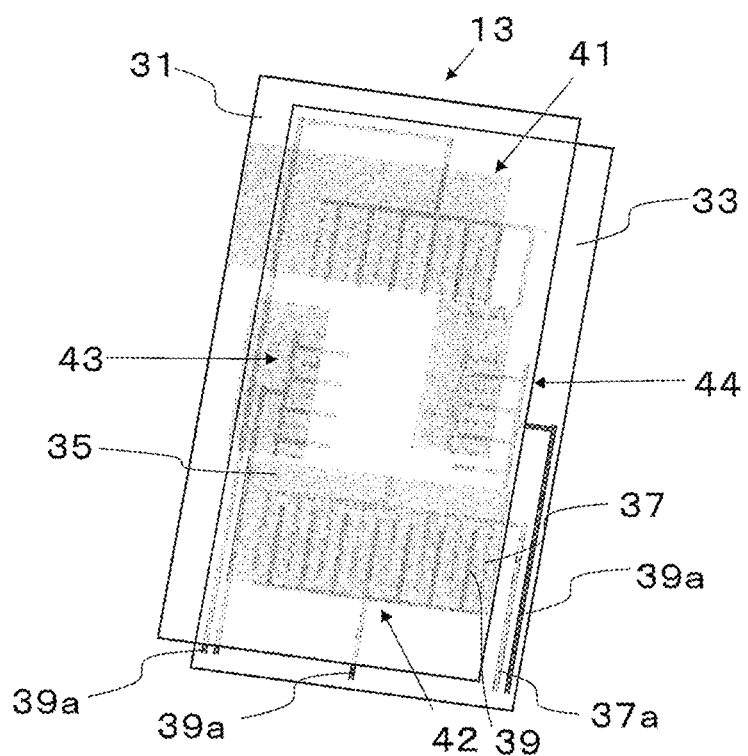
FIG. 4 is a plan view schematically illustrating a resistive-type pressure sensitive sensor.
Figure 5:
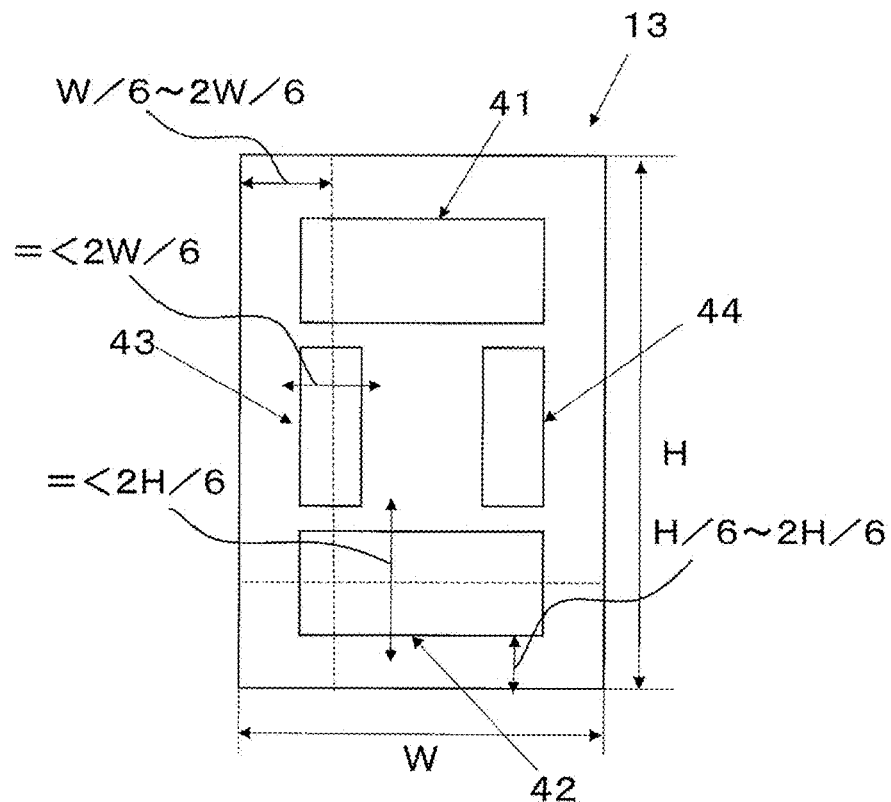
FIG. 5 is a diagram illustrating an arrangement of pressure sensitive portions of a resistive-type pressure sensitive sensor.

The pressure sensitive sensor 13 is described with reference to FIGS. 2 to 5. FIG. 2 is a cross-sectional view schematically illustrating a resistive-type pressure sensitive sensor. FIG. 3 is a cross-sectional view specifically illustrating a resistive-type pressure sensitive sensor. FIG. 4 is a plan view schematically illustrating a resistive-type pressure sensitive sensor. FIG. 5 is a diagram illustrating an arrangement of pressure sensitive portions of a resistive-type pressure sensitive sensor.

The pressure sensitive sensor 13 is a resistive-type pressure sensitive sensor. The resistive-type pressure sensitive sensor is also referred to as "Resistive Force Sensor".

The pressure sensitive sensor 13 has approximately the same area as that of the display device 11 and is formed over the entire surface thereof. This hardly causes a defect in the display state of the display device 11 in a case that the display device 11 receives the pressing force.

As illustrated in FIG. 2, the pressure sensitive sensor 13 includes an upper base substrate 31 (which is an example of a first insulating layer) and a lower base substrate 33 (which is an example of a second insulating layer) disposed with a thin air gap 27 interposed therebetween. The air gap 27 is maintained by spacers 34 (FIG. 3) provided at the peripheral edges of the upper base substrate 31 and the lower base substrate 33. The spacers 34 also serve as an adhesive for fixing the upper base substrate 31 to the lower base substrate 33.

On the upper base substrate 31, a pressure sensitive layer 35 (which is an example of a sensor member) is formed on a surface facing the lower base substrate 33.

On the lower base substrate 33, first electrodes 37 and second electrodes 39 are formed on a surface facing the upper base substrate 31. The first electrode 37 is a drive electrode, and the second electrode 39 is a sense electrode. The first electrodes 37 and the second electrodes 39 have a plurality of combinations of pairs of interdigitated comb teeth. A plurality of pressure sensitive layers 35 are formed corresponding to the pairs of interdigitated comb teeth, where the combination of the pressure sensitive layer 35; and the first electrode 37 and the second electrode 39 is hereinafter referred to as a pressure sensitive portion.

The pressure sensitive layer 35; and the first electrode 37 and the second electrode 39 are disposed with a gap interposed therebetween or are in contact with each other. The gap may be reserved by dot spacers (the same applies to hereinafter).

As illustrated in FIGS. 4 and 5, the pressure sensitive sensor 13 includes four pressure sensitive portions 41 to 44. The pressure sensitive sensor 13 includes a rectangular-shaped plane, and the pressure sensitive portions 41 to 44 are provided corresponding to the sides of the rectangle shape. Here, "corresponding" means that each pressure sensitive portion extends long in the same direction as each of the sides at a position proximate to each of the sides. More specifically, the first pressure sensitive portion 41 and the second pressure sensitive portion 42 are located symmetrically with respect to the plane center and correspond to the short sides of the pressure sensitive sensor 13. The third pressure sensitive portion 43 and the fourth pressure sensitive portion 44 are located symmetrically with respect to the plane center and correspond to the long sides of the pressure sensitive sensor 13. In other words, a pair of pressure sensitive portions are provided corresponding to two sides of the pressure sensitive sensor 13. Further, the pair of pressure sensitive portions have the same area and the same shape.

A single drive wiring line 37a, which is shared among the pressure sensitive portions, is connected to the first electrodes of each of the pressure sensitive portions. Moreover, individual sense wiring lines are connected to the second electrode portions of each of the pressure sensitive portions. In other words, in the present embodiment, four sense wiring lines 39a are provided in total.

A preferred condition for the pressure sensitive portion will be described below with reference to FIG. 5.

Assuming that the length (width) of the short side of the pressure sensitive sensor 13 is W, the distances between centers of the sides in the transverse direction of the third pressure sensitive portion 43 and the fourth pressure sensitive portion 44; and the edges of the pressure sensitive sensor 13 preferably ranges from W/6 to 2W/6. The widths in the transverse direction of the third pressure sensitive portion 43 and the fourth pressure sensitive portion 44 are preferably equal to or less than 2W/6.

Additionally, assuming that the length (height) of the long side of the pressure sensitive sensor 13 is H, distances between the centers of the sides in the longitudinal direction of the first pressure sensitive portion 41 and the second pressure sensitive portion 42; and the edges of the pressure sensitive sensor 13 preferably ranges from H/6 to 2H/6. The widths in the longitudinal direction of the first pressure sensitive portion 41 and the second pressure sensitive portion 42 are preferably equal to or less than 2H/6.

Although it is most preferred that both of the above two conditions are met, it suffices that either of the conditions is met.

As illustrated in FIG. 2, the pressure sensitive sensor 13 further includes a first elastic body 71 (which is an example of an elastic member) and a second elastic body 73 (which is an example of the elastic member). The first elastic body 71 is disposed on an upper surface of the upper base substrate 31. The second elastic body 73 is disposed on a lower surface of the lower base substrate 33. The first elastic body 71 and the second elastic body 73 have a thickness ranging from 100 to 1500 μm; and a 25% compressive stress ranging from 0.001 to 0.5 MPa (preferably in the range from 0.001 to 0.1 MPa and more preferably in the range from 0.001 to 0.05 MPa). The material of the first elastic body 71 and the second elastic body 73 is, for example, a foam body such as polyurethane, polypropylene, or acrylic, for example. The first elastic body 71 and the second elastic body 73 are bonded to at least one surface of the pressure sensitive sensor by an adhesive. However, the first elastic body 71 and the second elastic body 73 may be layered only being in contact with the pressure sensitive sensor.

Note that one of the first elastic body 71 and the second elastic body 73 may be omitted.

The upper base substrate 31 and the lower base substrate 33 are a flexible insulation film, and the material thereof includes polyethylene terephthalate (PET), polyethylene naphthalate (PEN), polyimide (PI), and polyetherimide (PEI), for example.

The first electrode 37 and the second electrode 39 are formed of, but not limited to, silver paste or copper paste, for example. However, it is preferred that the first electrode 37 and the second electrode 39 be formed of thermosetting-type electrically conductive paste. Note that the electrode may be a metal foil, a sputtered film, a vapor deposition film, a laminate film, or the like, and the material of the electrode does not include a paste.

The material of the pressure sensitive layer 35 may be a typical resistive material such as carbon; or a pressure sensitive ink. The composition constituting the pressure sensitive ink is formed of a material in which electrical properties such as electrical resistance value change in response to the external forces.

In a case that the cover member 7 is pressed by the operator, the cover member 7, the touch panel 9, and the display device 11 bend and become deformed. Specifically, the touch panel 9 and the display device 11 become deformed to protrude relative to the bottom portion 5b about the pressing point. As a result, the upper base substrate 31 and the lower base substrate 33, in the pressure sensitive sensor 13, are pressed to come close to each other, resulting in an increase in the area of a portion of the pressure sensitive layer 35 in contact with the comb-shaped electrode section. This reduces the sensor resistance between a pair of electrodes. As such, a change in the pressing force applied to the pressure sensitive sensor 13 causes a change in the resistance.

(3) Control Configuration of Information Input Apparatus

Figure 6:
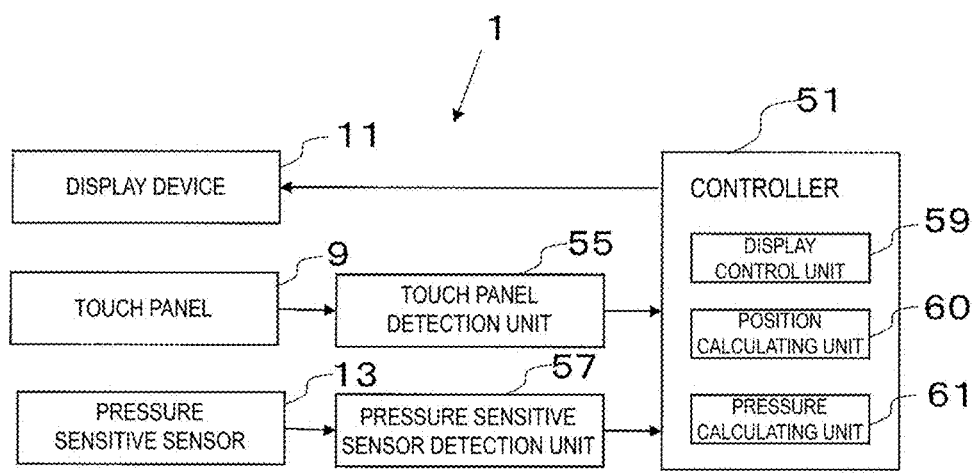
FIG. 6 is a control block diagram of an information input apparatus.

A control configuration of the information input apparatus 1 will be described with reference to FIG. 6. FIG. 6 is a control block diagram of an information input apparatus.

The information input apparatus 1 includes a controller 51.

The controller 51 is a computer system including a processor (e.g., CPU), a storage device (e.g., ROM, RAM, HDD, SSD, and the like), and various interfaces (e.g., A/D converter, D/A converter, communication interface, and the like). The controller 51 executes programs stored in the storage unit (corresponding to a part or all of the storage area of the storage device) to perform various control operations.

Specifically, the controller 51 is a device for performing various controls of the information input apparatus 1 on the basis of input signals from a touch panel detection unit 55 and a pressure sensitive sensor detection unit 57 (described below). For example, the controller 51, in a case that a human hand touch operation is performed, executes information processing based on the operation and further causes the display device 11 to display various types of image data.

The controller 51 may be configured by a single processor and may also be configured by a plurality of independent processors for each of the controls.

Some or all of the functions of the elements of the controller 51 may be realized as a program executable in a computer system that configures the controller 51. In addition, some of the functions of the elements of the controller 51 may be configured by a custom IC.

The information input apparatus 1 includes the touch panel detection unit 55. The touch panel detection unit 55 detects a detection signal of the touch panel 9.

The information input apparatus 1 includes the pressure sensitive sensor detection unit 57. The pressure sensitive sensor detection unit 57 including an AD converter unit (not illustrated) detects a signal from the pressure sensitive sensor 13. The AD converter unit converts, through A/D conversion, an analog output signal to a digital output value at a predetermined sample period.

The controller 51 includes a display control unit 59. The display control unit 59, which is, for example, an LCD driver, sends image data to the display device 11.

The controller 51 includes a position calculating unit 60. The position calculating unit 60 determines a touched position on the basis of a signal from the touch panel detection unit 55.

The controller 51 includes a pressure calculating unit 61 (which is an example of a pressure detection control unit). The pressure calculating unit 61 calculates the pressing force on the basis of a signal from the pressure sensitive sensor detection unit 57. Specifically, the pressure calculating unit 61 executes a step of causing the pressure sensitive sensor 13 to detect a pressure change for each of the pressure sensitive portions 41 to 44 and a step of adding a sign-reversed pressure change of one of a pair of pressure sensitive portions located at symmetrical positions to a pressure change of the other of the pair of pressure sensitive portions to amplify an output. This provides the pressure sensitive sensor 13 of the information input apparatus 1 with increased output, that is, enhanced sensitivity.

(4) Control Operation

Figure 7:
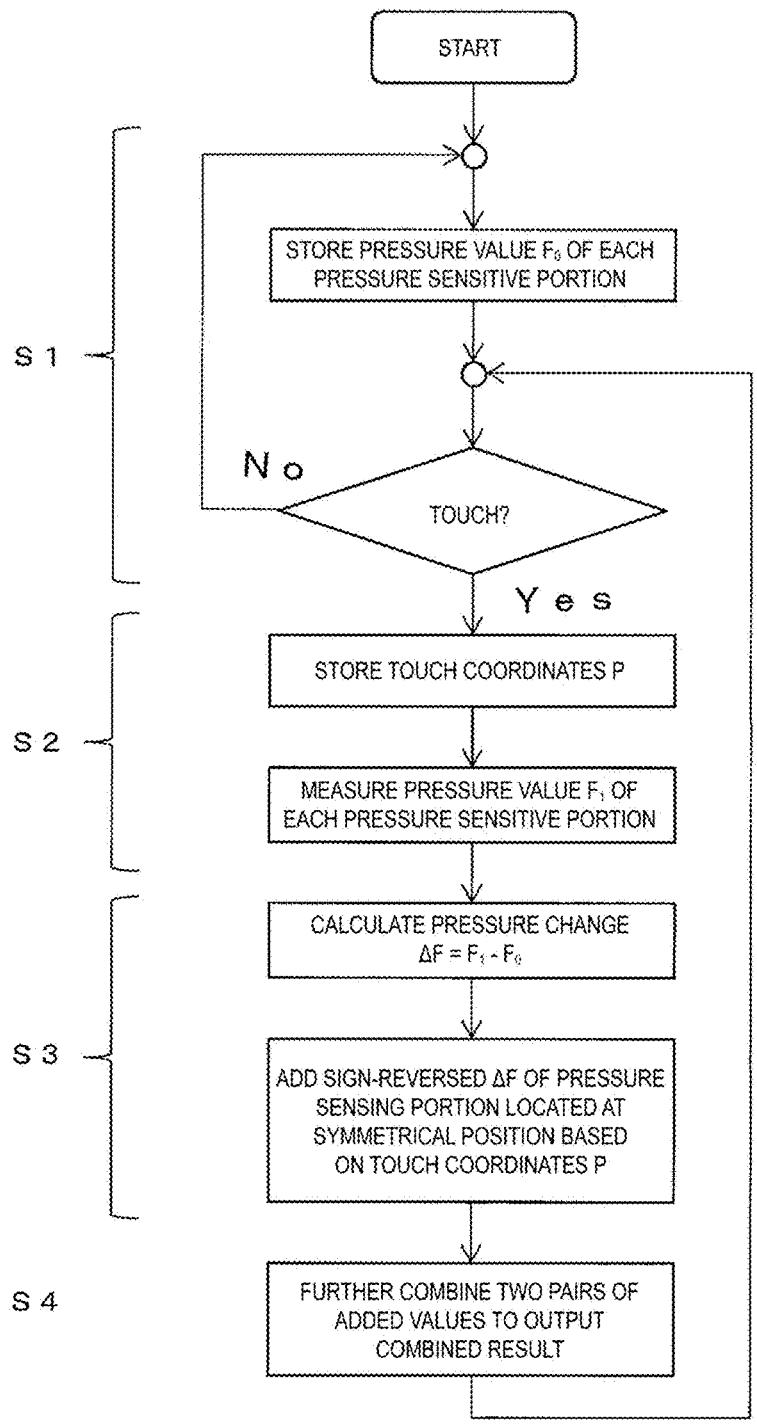
FIG. 7 is a flowchart illustrating a control operation of the information input apparatus.

A pressure calculation control operation by the pressure calculating unit 61 will be described with reference to FIG. 7. FIG. 7 is a flowchart illustrating a control operation of the information input apparatus.

The control flowchart to be described below is an exemplification, where each of the steps can be omitted and is replaceable as necessary. Further, a plurality of steps may be concurrently performed, or some or all of the steps may be performed in an overlapped manner.

Moreover, each of the blocks of the control flowchart is not limited to a single control operation and can be replaced with a plurality of control operations represented by a plurality of blocks.

In step S1, in the controller 51, the pressure calculating unit 61 stands by until the touch detection is performed by the touch panel 9, while storing the pressure value $F_0$ of each of the pressure sensitive portions 41 to 43.

In a case that it is determined that the touch detection is performed, a pressure detection control operation is performed.

Specifically, in step S2, the pressure calculating unit 61 stores the touch coordinates P obtained by the position calculating unit 60 and then measures the pressure value $F_1$ of each of the pressure sensitive portions 41 to 43. Note that in case of a resistive-type (the first embodiment now being described), the pressure value represents a resistance value. While, in case of a capacitance-type (the second embodiment to be described below), the pressure value represents an electrostatic capacitance value.

More specifically, during the detection operation described above, the pressure calculating unit 61 supplies a drive signal to the first pressure sensitive portion 41 through the single drive wiring line 37a and receives an electric signal through the four sense wiring lines 39a.

In step S3, the pressure calculating unit 61 combines the pressure changes between the pressure sensitive portions at the symmetrical positions. Specifically, the pressure change $\Delta F = F_1 - F_0$ of each of the pressure sensitive portions 41 to 44 is calculated, and next, on the basis of the touch coordinates P detected by the touch panel, between the pressure sensitive portions located at symmetrical positions, a sign-reversed pressure change detected by the pressure sensitive portion farther from the touch coordinates P is added to the pressure change detected by the pressure sensitive portion closer to the touch coordinates P. In this way, in a case where the sheet metal 21 is thin and low in rigidity in particular, the detection sensitivity of the pressure can be amplified by utilizing that a positive pressure change is obtained in the pressure sensitive portion closer to the touch coordinates, while a negative pressure change is obtained in the pressure sensitive portion, at a symmetrical position, farther from the touch coordinates.

In step S4, the pressure calculating unit 61 further combines the two pairs of added values to output the combined result. On the basis of the above, the pressing force is determined.

This provides the pressure sensitive sensor 13 with increased output, that is, enhanced sensitivity.

Supposing FIG. 1 as the structure of the related art, not only the cover member 7 but also the sheet metal 21 is strained in the same direction as the pressing direction, the sensitivity unfavorably becomes insufficient due to the lack of compression of the pressure sensitive sensor 13. In view of the above, in the present embodiment, the pressure sensitive portions are disposed as illustrated in FIG. 4, and the outputs of the pressure sensitive portions are inverted and amplified so that the sensitivity is enhanced even in the case of the structure illustrated in FIG. 1.

(5) First Modified Example

In the first embodiment, the first electrode and the second electrode are provided on the lower base substrate, and the pressure sensitive layer is provided on the upper base substrate. However, the arrangement relationship is not limited thereto.

Figure 8:
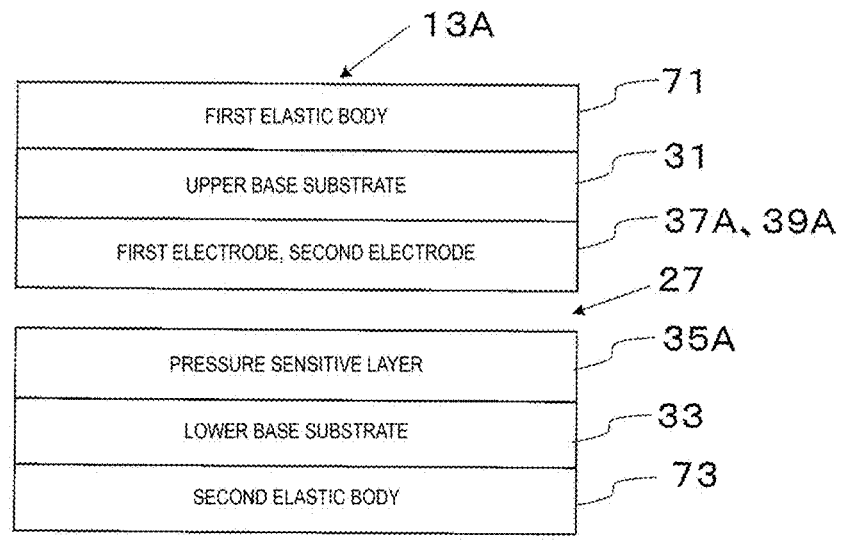
FIG. 8 is a cross-sectional view schematically illustrating a resistive-type pressure sensitive sensor according to a first modified example.

Hereinafter, such a modified example will be described with reference to FIG. 8. FIG. 8 is a cross-sectional view schematically illustrating a resistive-type pressure sensitive sensor according to the first modified example.

A pressure sensitive sensor 13A is a resistive-type pressure sensitive sensor. As illustrated in FIG. 8, the pressure sensitive sensor 13A includes the upper base substrate 31 (which is an example of the first insulating layer) and the lower base substrate 33 (which is an example of the second insulating layer) disposed with the thin air gap 27 interposed therebetween.

On the upper base substrate 31, a first electrode 37A and a second electrode 39A are formed on a surface facing the lower base substrate 33. The first electrode 37A is a drive electrode, and the second electrode 39B is a sense electrode. These structures and functions are the same as in the first embodiment.

On the lower base substrate 33, a pressure sensitive layer 35A (which is an example of the sensor member) is formed on a surface facing the upper base substrate 31. This structure and function are the same as in the first embodiment.

(6) Second Modified Example

Although in the first embodiment, the two types of electrodes are provided on the same base substrate in the resistive-type pressure sensitive sensor, the arrangement structure of the electrodes is not limited thereto. For example, the two types of electrodes may be each provided on each of the opposing base substrates.

Figure 9:
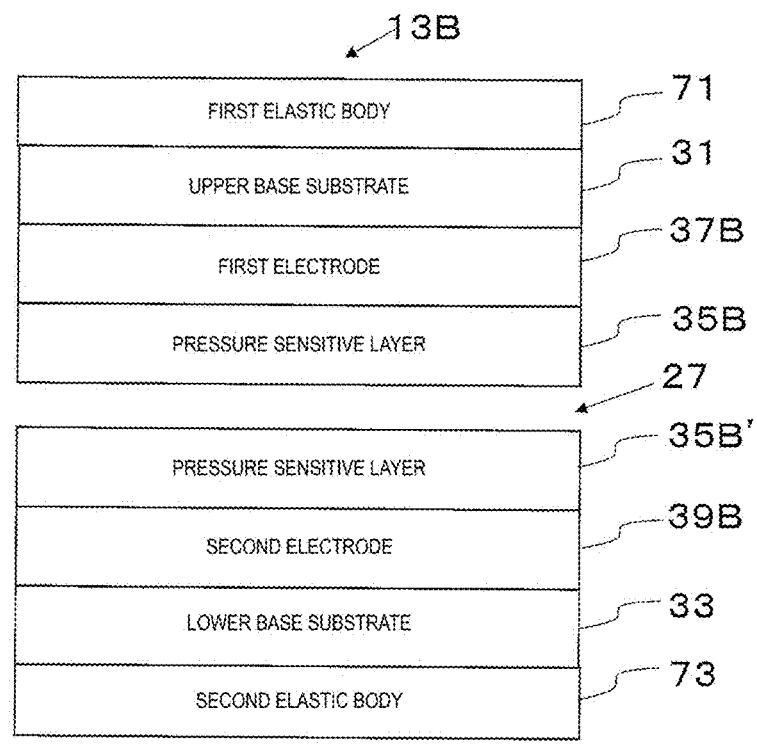
FIG. 9 is a cross-sectional view schematically illustrating a resistive-type pressure sensitive sensor according to a second modified example.
Figure 10:
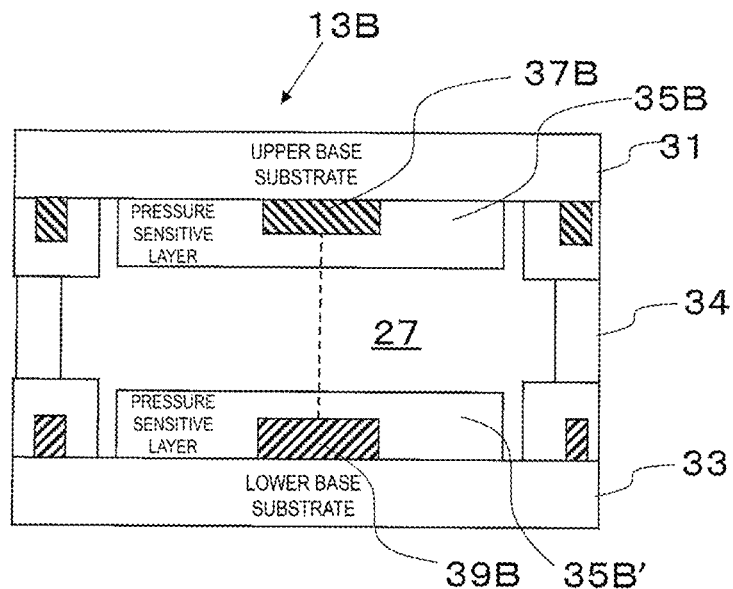
FIG. 10 is a cross-sectional view specifically illustrating a resistive-type pressure sensitive sensor according to a second modified example.
Figure 11:
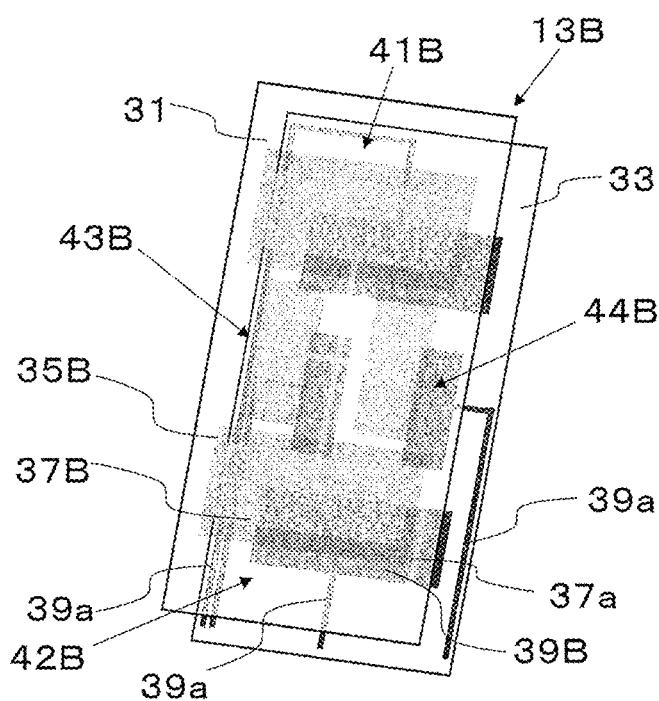
FIG. 11 is a plan view schematically illustrating a resistive-type pressure sensitive sensor of a second modified example.

Such a modified example will be described with reference to FIGS. 9 to 11. FIG. 9 is a cross-sectional view schematically illustrating a resistive-type pressure sensitive sensor according to the second modified example. FIG. 10 is a cross-sectional view specifically illustrating a resistive-type pressure sensitive sensor according to the second modified example. FIG. 11 is a plan view schematically illustrating a resistive-type pressure sensitive sensor according to the second modified example.

A pressure sensitive sensor 13B is a resistive-type pressure sensitive sensor. As illustrated in FIG. 9, the pressure sensitive sensor 13B includes the upper base substrate 31 (which is an example of the first insulating layer) and the lower base substrate 33 (which is an example of the second insulating layer) disposed with the thin air gap 27 interposed therebetween. The air gap 27 is maintained by the spacers 34 (FIG. 10) provided at the peripheral edges of the upper base substrate 31 and the lower base substrate 33. The spacers 34 also serve as an adhesive for fixing the upper base substrate 31 to the lower base substrate 33.

On the upper base substrate 31, a first electrode 37B is formed on a surface facing the lower base substrate 33. The first electrode 37B is, for example, a drive electrode. On the upper base substrate 31, a pressure sensitive layer 35B (which is an example of the sensor member) is further formed covering the first electrode 37B.

On the lower base substrate 33, the second electrode 39B is formed on a surface facing the upper base substrate 31. The second electrode 39B is, for example, a sense electrode. The first electrode 37B and the second electrode 39B are shaped to have a certain extension in a plan view. On the upper base substrate 31, a pressure sensitive layer 35W (which is an example of the sensor member) is further formed covering the second electrode 39B.

As illustrated in FIG. 11, the pressure sensitive sensor 13B includes four pressure sensitive portions 41B to 44B. The pressure sensitive sensor 13B includes a rectangular-shaped plane, and the pressure sensitive portions 41B to 44B are provided corresponding to the sides of the rectangle shape. Here, "corresponding" means that each pressure sensitive portion is located at a position proximate to each of the sides. More specifically, the first pressure sensitive portion 41B and the second pressure sensitive portion 42B are located symmetrically with respect to the plane center. The third pressure sensitive portion 43B and the fourth pressure sensitive portion 44B are located symmetrically with respect to the plane center. In other words, a pair of pressure sensitive portions are provided corresponding to two sides of the pressure sensitive sensor 13B. Further, the pair of pressure sensitive portions have the same area and the same shape.

As illustrated in FIG. 9, the pressure sensitive sensor 13B further includes the first elastic body 71 and the second elastic body 73. The first elastic body 71 is disposed on an upper surface of the upper base substrate 31. The second elastic body 73 is disposed on a lower surface of the lower base substrate 33. Note that one of the first elastic body 71 and the second elastic body 73 may be omitted.

(7) Third Modified Example

Although, in the second modified example, both of the two types of electrodes are covered by the pressure sensitive layer, the present disclosure is not limited to such an embodiment. For example, the pressure sensitive layer may cover one of the electrodes alone.

Figure 12:
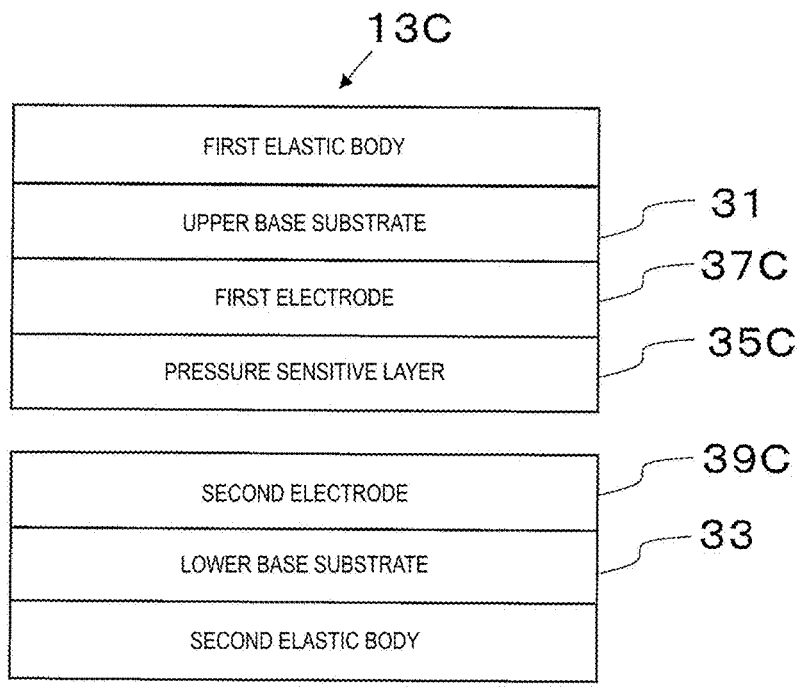
FIG. 12 is a cross-sectional view schematically illustrating a resistive-type pressure sensitive sensor according to a third modified example.

Hereinafter, such a modified example will be described with reference to FIG. 12. FIG. 12 is a cross-sectional view schematically illustrating a resistive-type pressure sensitive sensor according to the third modified example.

On the upper base substrate 31, a first electrode 37C is formed on a surface facing the lower base substrate 33. The first electrode 37C is, for example, a drive electrode. On the upper base substrate 31, a pressure sensitive layer 35C (which is an example of the sensor member) is further formed covering the first electrode 37C.

On the lower base substrate 33, a second electrode 39C is formed on a surface facing the upper base substrate 31. The second electrode 39C is, for example, a sense electrode. The first electrode 37C and the second electrode 39C are shaped to have a certain extension in a plan view and are specifically formed in rectangular shape. A pressure sensitive layer is not formed on the second electrode 39C, that is, the second electrode 39C is exposed.

(8) Fourth Modified Example

Although in the second modified example, both of the two types of electrodes are covered by the pressure sensitive layer, the present disclosure is not limited to such an embodiment. For example, the pressure sensitive layer may cover one of the electrodes alone.

Figure 13:
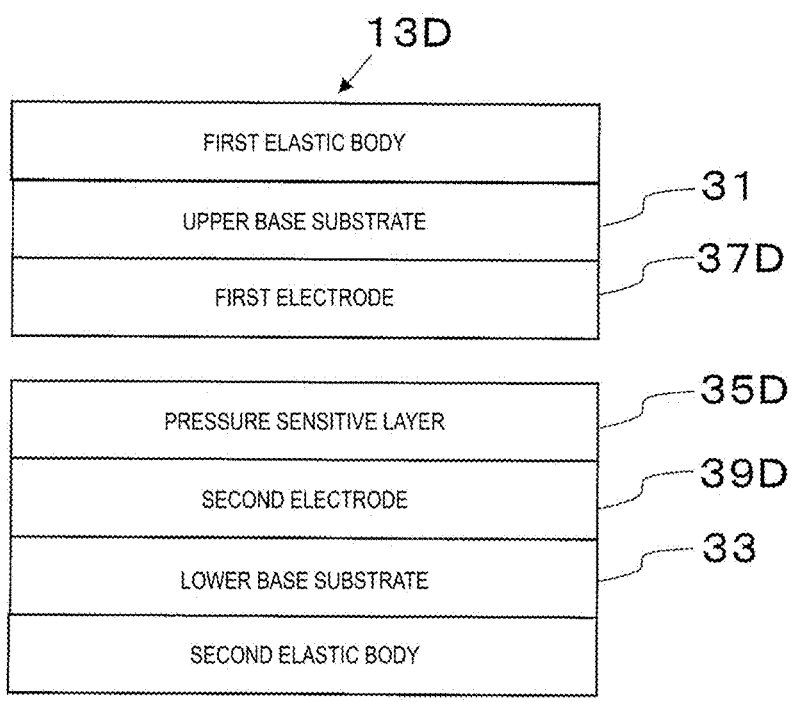
FIG. 13 is a cross-sectional view schematically illustrating a resistive-type pressure sensitive sensor according to a fourth modified example.

Hereinafter, such a modified example will be described with reference to FIG. 13. FIG. 13 is a cross-sectional view schematically illustrating a resistive-type pressure sensitive sensor according to the fourth modified example.

On the upper base substrate 31, a first electrode 37D is formed on a surface facing the lower base substrate 33. The first electrode 37D is, for example, a drive electrode. A pressure sensitive layer is not formed on the first electrode 37D, that is, the first electrode 37D is exposed.

On the lower base substrate 33, a second electrode 39D is formed on a surface facing the upper base substrate 31. The second electrode 39D is, for example, a sense electrode. The first electrode 37D and the second electrode 39D are shaped to have a certain extension in a plan view. On the upper base substrate 31, a pressure sensitive layer 35D (which is an example of the sensor member) is further formed covering the second electrode 39D.

2. Second Embodiment

Although in the first embodiment, a resistive-type pressure sensitive sensor has been described as a pressure sensitive sensor, the present disclosure is not limited to such an embodiment. The pressure sensitive sensor may be, for example, of capacitance-type sensor.

Figure 14:
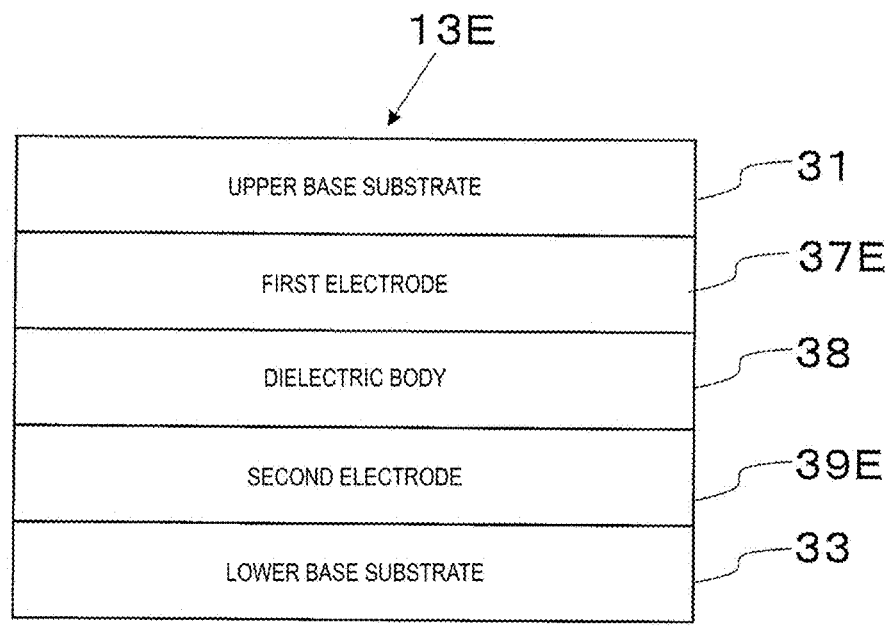
FIG. 14 is a cross-sectional view schematically illustrating a capacitance-type pressure sensitive sensor of an information input apparatus of the second embodiment.
Figure 15:
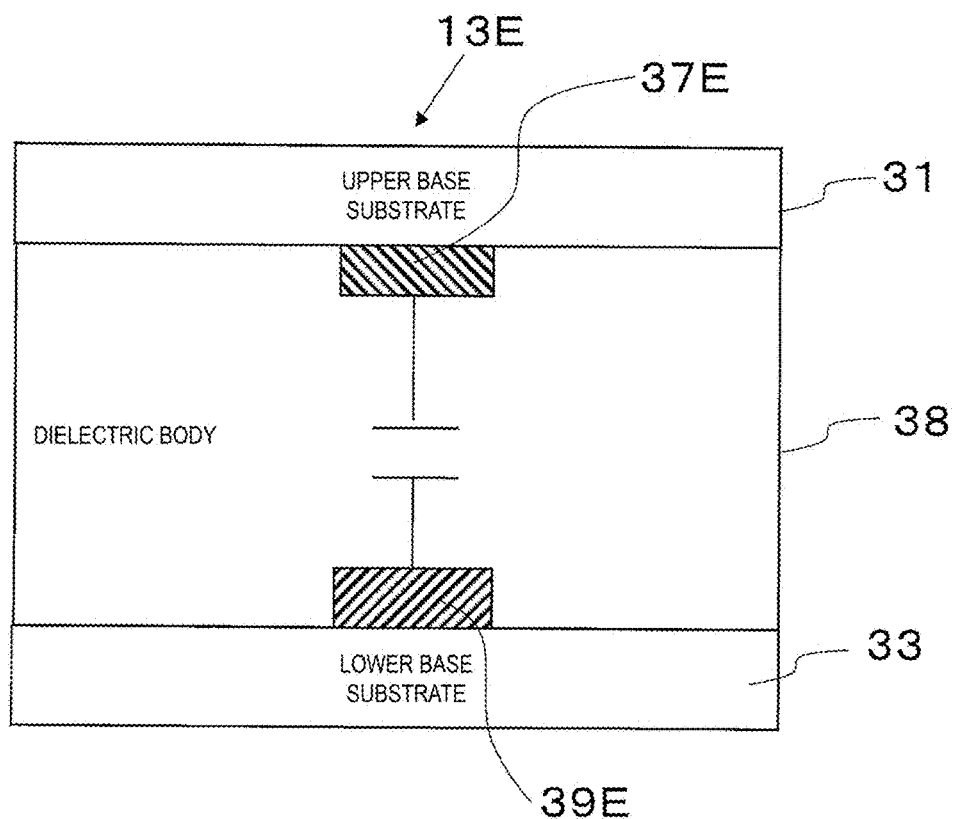
FIG. 15 is a cross-sectional view specifically illustrating a capacitance-type pressure sensitive sensor.
Figure 16:
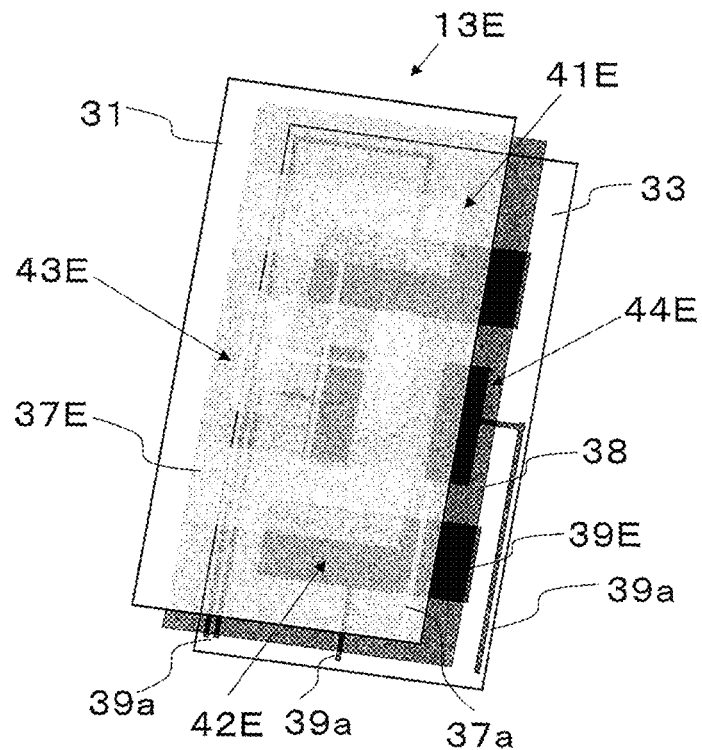
FIG. 16 is a plan view schematically illustrating a capacitance-type pressure sensitive sensor.

Such an embodiment will be described with reference to FIGS. 14 to 16. FIG. 14 is a cross-sectional view schematically illustrating a capacitance-type pressure sensitive sensor of an information input apparatus of the second embodiment. FIG. 15 is a cross-sectional view specifically illustrating a capacitance-type pressure sensitive sensor. FIG. 16 is a plan view schematically illustrating a capacitance-type pressure sensitive sensor.

A pressure sensitive sensor 13E is a capacitance-type pressure sensitive sensor. As illustrated in FIG. 14, the pressure sensitive sensor 13E includes the upper base substrate 31 (which is an example of the first insulating layer), the lower base substrate 33 (which is an example of the second insulating layer), and a dielectric body 38 (which is an example of the sensor member) disposed therebetween. The dielectric body 38 is made of an elastically deformable material.

On the upper base substrate 31, a first electrode 37E is formed on a surface facing the lower base substrate 33. The first electrode 37E is, for example, a drive electrode.

On the lower base substrate 33, a second electrode 39E is formed on a surface facing the upper base substrate 31. The second electrode 39E is, for example, a sense electrode.

The first electrode 37E and the second electrode 39E are shaped to have a certain extension in a plan view and are specifically formed in rectangular shape.

As illustrated in FIG. 16, the pressure sensitive sensor 13E includes four pressure sensitive portions 41E to 44E. The pressure sensitive sensor 13E includes a rectangular-shaped plane, and the pressure sensitive portions 41E to 44E are provided corresponding to the sides of the rectangle shape. Here, "corresponding" means that each pressure sensitive portion is located at a position proximate to each of the sides. More specifically, the first pressure sensitive portion 41E and the second pressure sensitive portion 42E are located symmetrically with respect to the plane center. The third pressure sensitive portion 43E and the fourth pressure sensitive portion 44E are located symmetrically with respect to the plane center. In other words, a pair of pressure sensitive portions are provided corresponding to two sides of the pressure sensitive sensor 13E. Further, the pair of pressure sensitive portions have the same area and the same shape.

In a case that the cover member 7 is pressed by the operator, the cover member 7, the touch panel 9, and the display device 11 bend and become deformed. Specifically, the touch panel 9 and the display device 11 become deformed to protrude relative to the bottom portion 5b about the pressing point. As a result, the upper base substrate 31 and the lower base substrate 33, in the pressure sensitive sensor 13E, are pressed to come close to each other, resulting in a variation in the electrostatic capacitance between the first electrode 37E and the second electrode 39E.

(1) First Modified Example

Although in the second embodiment, the electrodes are formed on the surfaces of the base substrates facing to each other, the present disclosure is not limited to such an embodiment, and the electrode may be formed on a surface opposite to the surface facing the base substrate.

Figure 17:
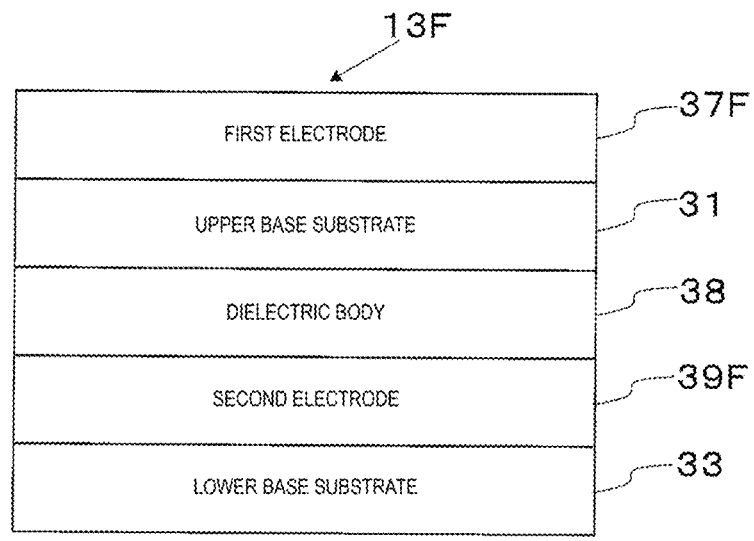
FIG. 17 is a plan view schematically illustrating a capacitance-type pressure sensitive sensor according to a first modified example.

Hereinafter, such a modified example will be described with reference to FIG. 17. FIG. 17 is a plan view schematically illustrating a capacitance-type pressure sensitive sensor according to the first modified example.

As illustrated in FIG. 17, a pressure sensitive sensor 13F includes the upper base substrate 31 (which is an example of the first insulating layer), the lower base substrate 33 (which is an example of the second insulating layer), and the dielectric body 38 disposed therebetween. The dielectric body 38 is made of an elastically deformable material.

On the upper base substrate 31, a first electrode 37F is formed on a surface opposite to the lower base substrate 33. The first electrode 37F is, for example, a drive electrode.

On the lower base substrate 33, a second electrode 39F is formed on a surface facing the upper base substrate 31. The second electrode 39F is, for example, a sense electrode.

(2) Second Modified Example

Figure 18:
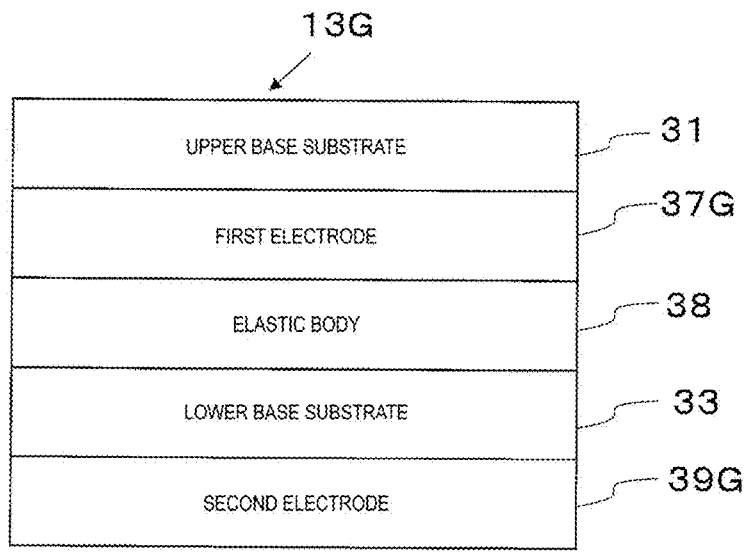
FIG. 18 is a plan view schematically illustrating a capacitance-type pressure sensitive sensor according to a second modified example.

A modified example similar to the first modified example will be described with reference to FIG. 18. FIG. 18 is a plan view schematically illustrating a capacitance-type pressure sensitive sensor according to the second modified example.

As illustrated in FIG. 18, a pressure sensitive sensor 13G includes the upper base substrate 31 (which is an example of the first insulating layer), the lower base substrate 33 (which is an example of the second insulating layer), and the dielectric body 38 disposed therebetween. The dielectric body 38 is made of an elastically deformable material.

On the upper base substrate 31, a first electrode 37G is formed on a surface facing the lower base substrate 33. The first electrode 37G is, for example, a drive electrode.

On the lower base substrate 33, a second electrode 39G is formed on a surface opposite to the upper base substrate 31. The second electrode 39G is, for example, a sense electrode.

(3) Third Modified Example

Figure 19:
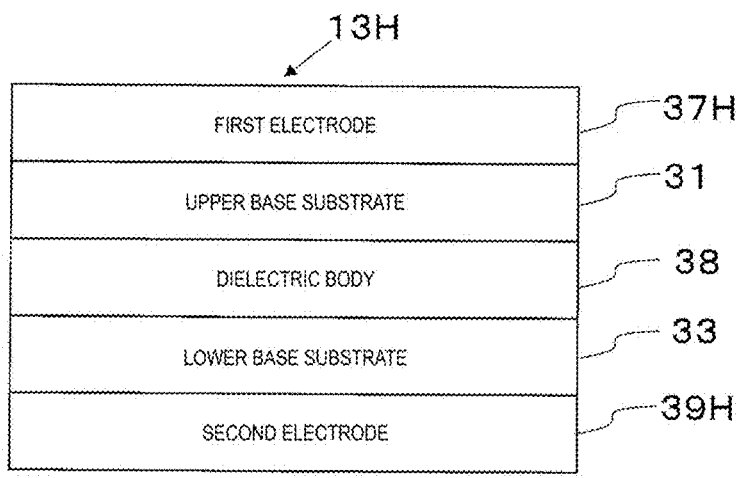
FIG. 19 is a plan view schematically illustrating a capacitance-type pressure sensitive sensor according to a third modified example.

A modified example similar to the first modified example will be described with reference to FIG. 19. FIG. 19 is a plan view schematically illustrating a capacitance-type pressure sensitive sensor according to the third modified example.

A pressure sensitive sensor 13H is a capacitance-type pressure sensitive sensor. As illustrated in FIG. 19, the pressure sensitive sensor 13H includes the upper base substrate 31 (which is an example of the first insulating layer), the lower base substrate 33 (which is an example of the second insulating layer), and the dielectric body 38 disposed therebetween. The dielectric body 38 is made of an elastically deformable material.

On the upper base substrate 31, a first electrode 37H is formed on a surface opposite to the lower base substrate 33. The first electrode 37H is, for example, a drive electrode.

On the lower base substrate 33, a second electrode 39H is formed on a surface opposite to the upper base substrate 31. The second electrode 39H is, for example, a sense electrode.

(4) Fourth Modified Example

Although in the second embodiment, two types of electrodes are provided in the capacitance-type pressure sensitive sensor, the arrangement structure of the electrodes is not limited thereto. For example, three types of electrodes may be provided.

Figure 20:
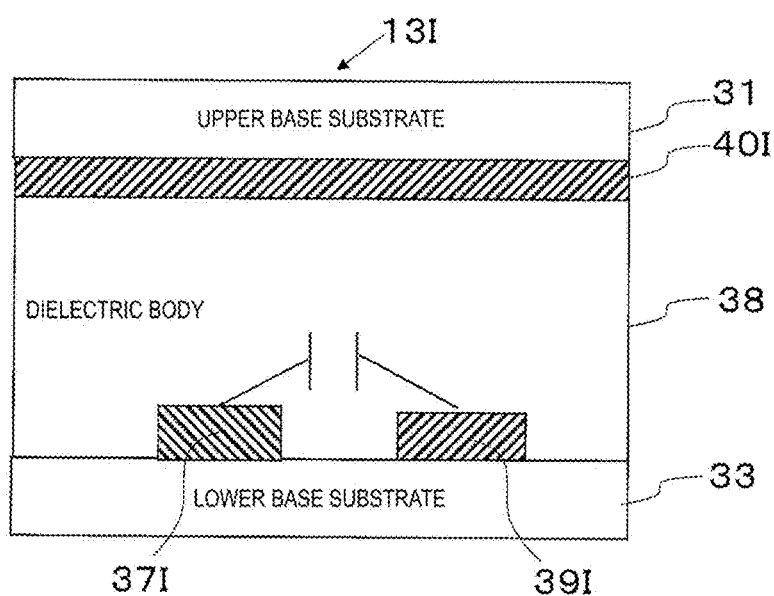
FIG. 20 is a plan view schematically illustrating a capacitance-type pressure sensitive sensor according to a fourth modified example.
Figure 21:
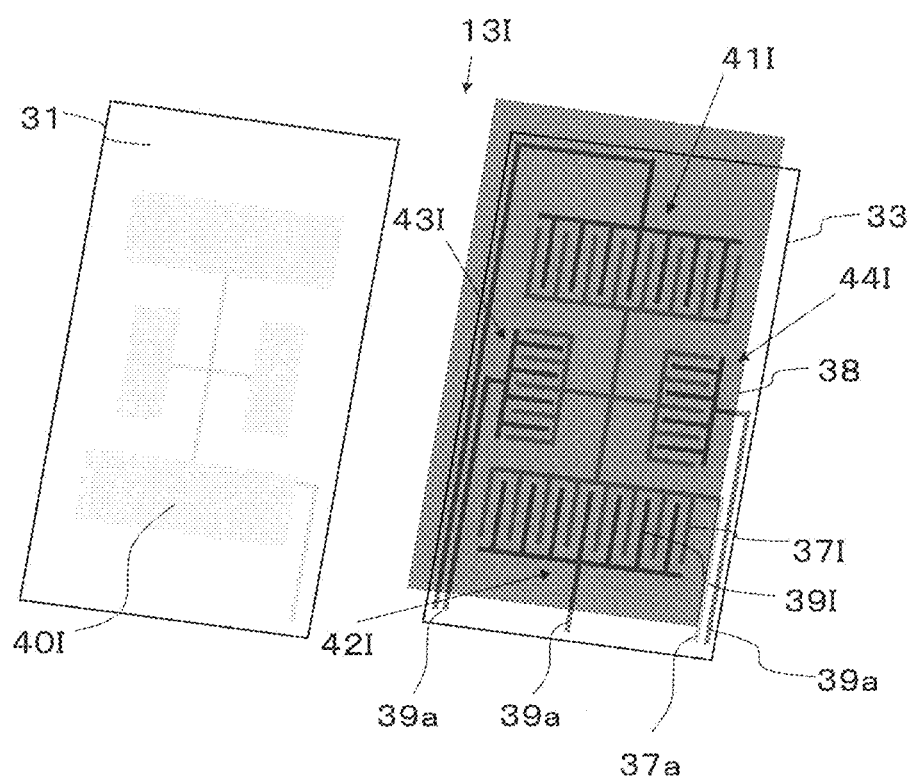
FIG. 21 is a plan view schematically illustrating a capacitance-type pressure sensitive sensor according to a fourth modified example.

Such an embodiment will be described with reference to FIGS. 20 and 21. FIGS. 20 and 21 are plan views schematically illustrating a capacitance-type pressure sensitive sensor according to the fourth modified example.

A pressure sensitive sensor 13I is a capacitance-type pressure sensitive sensor. As illustrated in FIG. 20, the pressure sensitive sensor 13I includes the upper base substrate 31 (which is an example of the first insulating layer), the lower base substrate 33 (which is an example of the second insulating layer), and the dielectric body 38 disposed therebetween. The dielectric body 38 is made of an elastically deformable material.

On the upper base substrate 31, a third electrode 40I is formed on a surface facing the lower base substrate 33. The third electrode 40I is, for example, a common electrode.

On the lower base substrate 33, a first electrode 37I and a second electrode 39I are formed on a surface facing the upper base substrate 31. The first electrode 37I is, for example, a drive electrode, and the second electrode 39I is, for example, a sense electrode.

The first electrode 37I and the second electrode 39I have a plurality of combinations of pairs of interdigitated comb teeth. A plurality of third electrodes 40I are formed corresponding to the pairs of comb teeth, where the combination of the first electrode 37I, the second electrode 39I, and the third electrode 40I constitutes the pressure sensitive portion.

As illustrated in FIG. 21, the pressure sensitive sensor 13I includes four pressure sensitive portions 41I to 44I. The pressure sensitive sensor 13I includes a rectangular-shaped plane, and the pressure sensitive portions 41I to 44I are provided corresponding to the sides of the rectangle shape. Here, "corresponding" means that each pressure sensitive portion is located at a position proximate to each of the sides. More specifically, the first pressure sensitive portion 41I and the second pressure sensitive portion 42I are located symmetrically with respect to the plane center. The third pressure sensitive portion 43I and the fourth pressure sensitive portion 44I are located symmetrically with respect to the plane center. In other words, a pair of pressure sensitive portions are provided corresponding to two sides of the pressure sensitive sensor 13I. Further, the pair of pressure sensitive portions have the same area and the same shape.

In a case that the cover member 7 is pressed by the operator, the cover member 7, the touch panel 9, and the display device 11 bend and become deformed. Specifically, the touch panel 9 and the display device 11 become deformed to protrude relative to the bottom portion 5b about the pressing point. As a result, the upper base substrate 31 and the lower base substrate 33, in the pressure sensitive sensor 13I, are pressed to come close to each other, resulting in a variation in the electrostatic capacitance between the first electrode 37I and the second electrode 39I.

3. Third Embodiment

Although in the first embodiment and the second embodiment, the touch panel and the display device are provided separately, the present disclosure is not limited to such embodiments. For example, the touch panel and the display device may be integrally formed.

Figure 22:
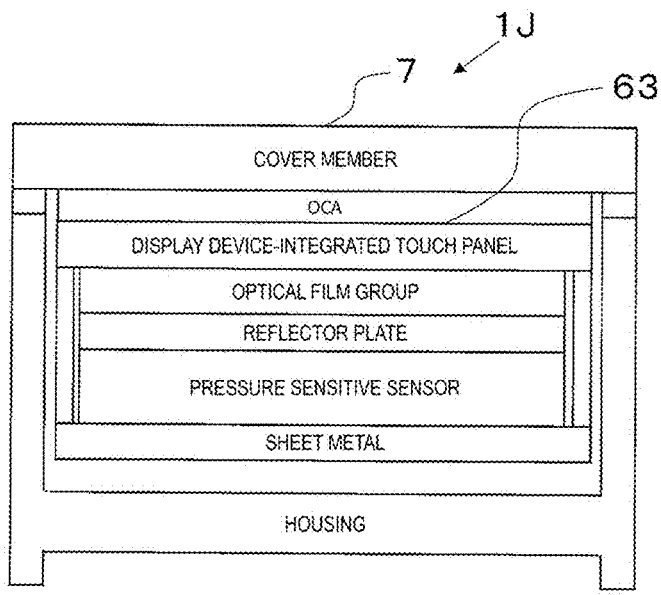
FIG. 22 is a cross-sectional view schematically illustrating an information input apparatus according to a third embodiment.

Such an embodiment will be described with reference to FIG. 22. FIG. 22 is a cross-sectional view schematically illustrating an information input apparatus according to the third embodiment.

In FIG. 22, a display device-integrated touch panel 63 is provided on the lower surface of the cover member 7. The integration of the display device and the touch panel is based on in-cell, on-cell, or other schemes.

4. Fourth Embodiment

Although in the first to third embodiments, a gap is reserved between the sensor structure 25 and the bottom portion 5b of the housing 5, the present disclosure is not limited to such embodiments. For example, the structure may also be such that the sensor structure is supported in contact with the bottom portion of the chassis.

Figure 23:
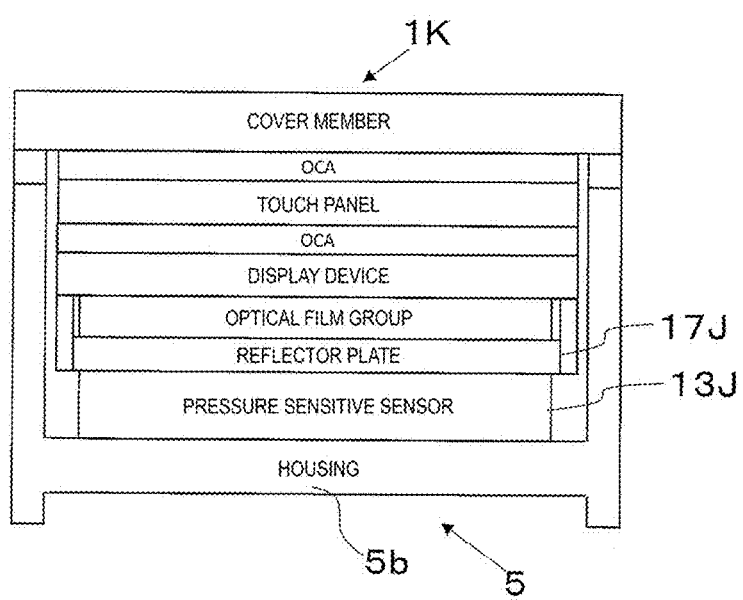
FIG. 23 is a cross-sectional view schematically illustrating an information input apparatus according to a fourth embodiment.

Such an embodiment will be described with reference to FIG. 23. FIG. 23 is a cross-sectional view schematically illustrating an information input apparatus according to the fourth embodiment.

In FIG. 23, a pressure sensitive sensor 13J is provided beneath a reflector plate 17J. In other words, the pressure sensitive sensor 13J is disposed interposed between the reflector plate 17J and the bottom portion 5b of the housing 5.

According to this embodiment as well, the same effects as in the first embodiment can be obtained.

5. Other Embodiments

Although in the first to third embodiments, the pressure sensitive portion is provided one by one corresponding to each of the sides of the rectangular base substrate, the present disclosure is not limited to such embodiments. For example, a plurality of pressure sensitive portions may be provided corresponding to each of the sides of the rectangle shape.

Figure 24:
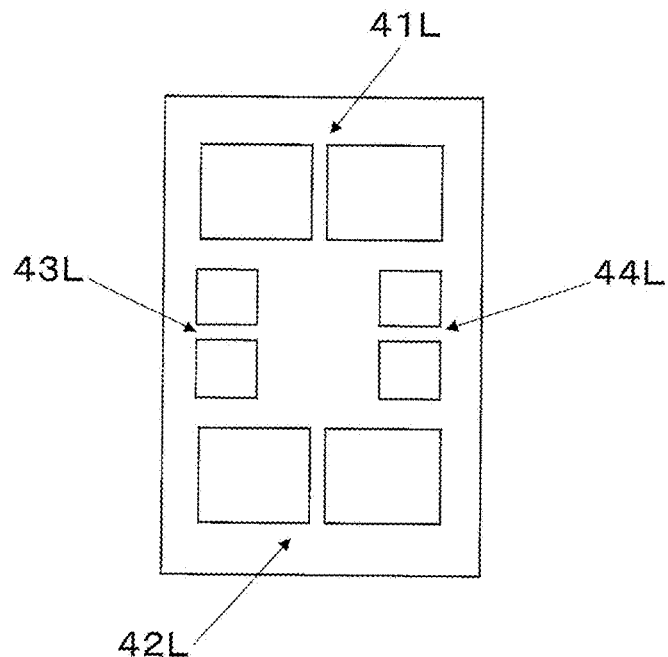
FIG. 24 is a plan view illustrating an arrangement variation of pressure sensitive portions of a pressure sensitive sensor.
Figure 25:
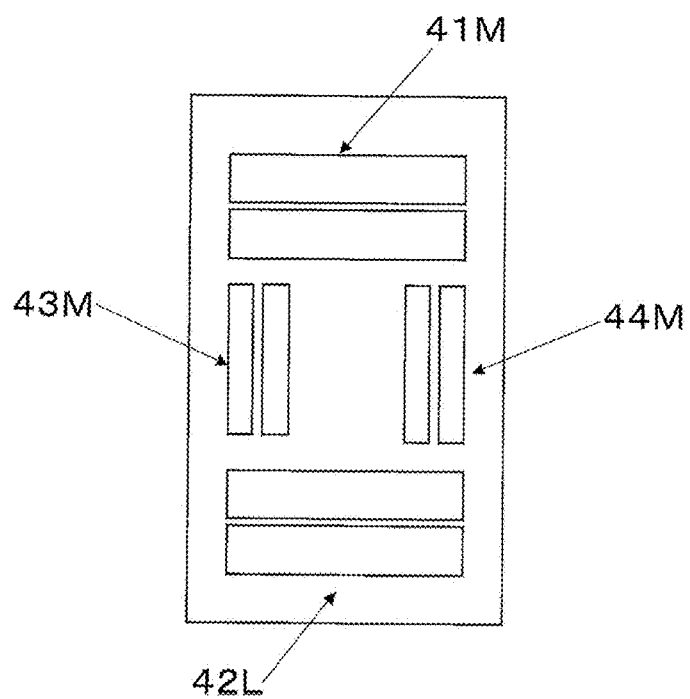
FIG. 25 is a plan view illustrating an arrangement variation of pressure sensitive portions of a pressure sensitive sensor.
Figure 26:
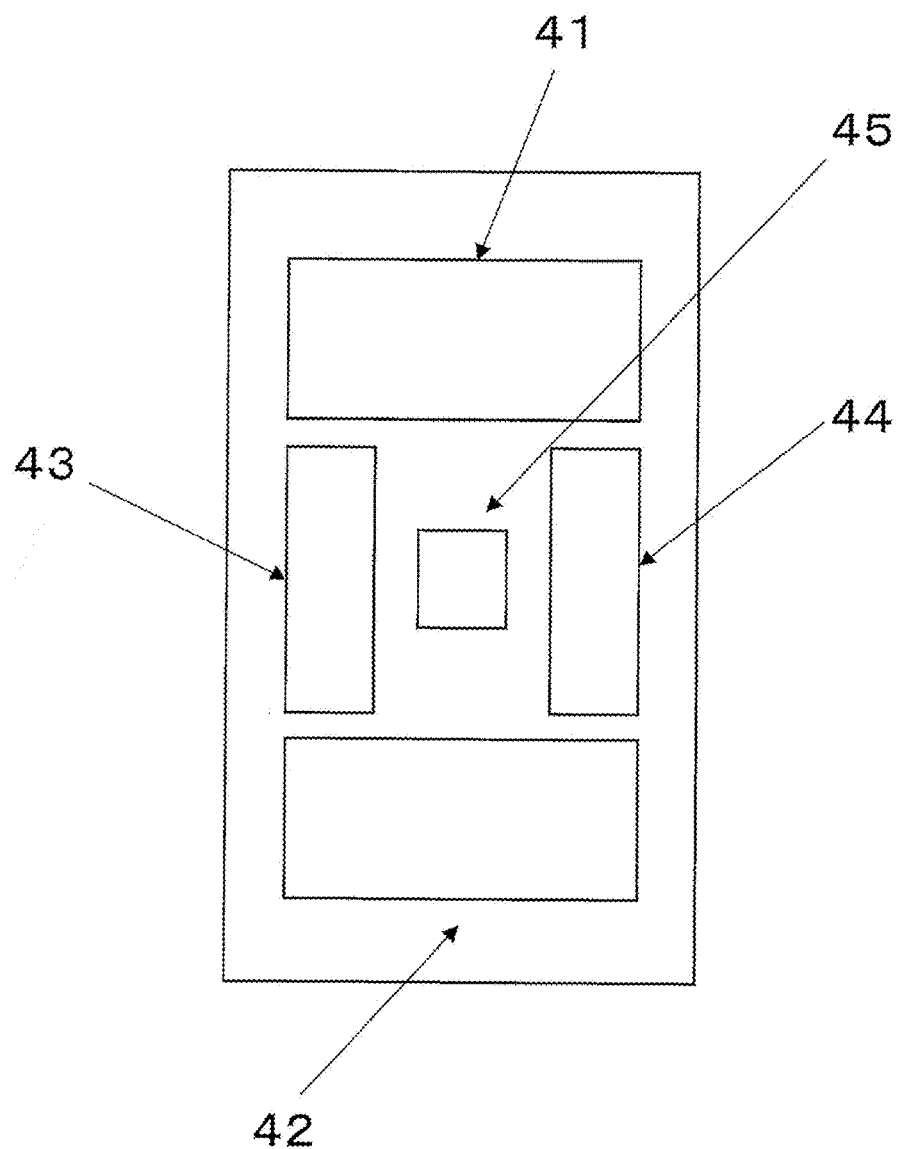
FIG. 26 is a plan view illustrating an arrangement variation of a pressure sensitive portion of a pressure sensitive sensor.

Such an embodiment will be described with reference to FIGS. 24 to 26. FIGS. 24 to 26 are plan views illustrating arrangement variations of pressure sensitive portions of pressure sensitive sensors.

In the modified example illustrated in FIG. 24, a first pressure sensitive portion 41L includes a pair of pressure sensitive portions divided in the extending direction of the corresponding side. A second pressure sensitive portion 42L includes a pair of pressure sensitive portions divided in the extending direction of the corresponding side. A third pressure sensitive portion 43L includes a pair of pressure sensitive portions divided in the extending direction of the corresponding side. A fourth pressure sensitive portion 44L includes a pair of pressure sensitive portions divided in the extending direction of the corresponding side.

In the modified example illustrated in FIG. 25, a first pressure sensitive portion 41M includes a pair of pressure sensitive portions divided in the direction intersecting the extending direction of the corresponding side. A second pressure sensitive portion 42M includes a pair of pressure sensitive portions divided in the direction intersecting the extending direction of the corresponding side. A third pressure sensitive portion 43M includes a pair of pressure sensitive portions divided in the direction intersecting the extending direction of the corresponding side. A fourth pressure sensitive portion 44M includes a pair of pressure sensitive portions divided in the direction intersecting the extending direction of the corresponding side.

In the modified example illustrated in FIG. 26, in addition to the pressure sensitive portions 41 to 44 of the first embodiment, a pressure sensitive portion 45 is provided at the plane center.

6. Still Other Embodiments

Although the plurality of embodiments of the present disclosure have been described as above, the present disclosure is not limited to the above-described embodiments, and various modifications are possible without departing from the gist of the invention. In particular, the plurality of embodiments and modified examples, which are described in the present specification, can be freely combined with one another.

The pressure sensitive sensor is not limited to a resistive-type pressure sensitive sensor and a capacitance-type pressure sensitive sensor.

The planar shape of the pressure sensitive portion is not limited to a rectangle shape. The planar shape of the pressure sensitive portion may be a square shape, a straight line shape, a curved line shape, or a combination of straight lines. Additionally, the planar shape of the pressure sensitive portion may be a shape along a side of the base substrate.

INDUSTRIAL APPLICABILITY

The present disclosure can be broadly applied in pressure detection devices and information input apparatuses using the same.

REFERENCE SIGNS LIST

1 Information input apparatus
5 Housing
5*a* Recessed portion
5*b* Bottom portion
5*c* Side portion
5*d* Edge portion
7 Cover member
9 Touch panel
11 Display device
13 Pressure sensitive sensor
15 Optical film group
17 Reflector plate
19 Pressure sensitive sensor
21 Sheet metal
23 Support
24 Gap
25 Sensor structure
41 First pressure sensitive portion
42 Second pressure sensitive portion
43 Third pressure sensitive portion
44 Fourth pressure sensitive portion
51 Controller
55 Touch panel detection unit
57 Pressure sensitive sensor detection unit
59 Display control unit
60 Position calculating unit
61 Pressure calculating unit

The invention claimed is:
1. A pressure detection device comprising:
a pressure sensitive sensor including
a first insulating layer,
a second insulating layer disposed facing the first insulating layer,
a sensor member formed on a surface of at least one of the first insulating layer and the second insulating layer, the sensor member including a pair of pressure sensitive portions located symmetrically with respect to a plane center,
an elastic member disposed at a freely-selected touch position at which a touch pressing force is applied, and
a drive electrode and a sense electrode disposed with the sensor member interposed between the drive electrode and the sense electrode; and
a pressure detection control unit configured to
cause the pressure sensitive sensor to detect a pressure change for each of the pair of pressure sensitive portions, and
add a sign-reversed pressure change of a pressure sensitive portion farther from the freely-selected touch position of the pair of pressure sensitive portions to a pressure change of a pressure sensitive portion closer to the freely-selected touch position of the pair of pressure sensitive portions, in order to amplify an output.

2. The pressure detection device according to claim 1, wherein the pair of pressure sensitive portions have a same area and a same shape.

3. The pressure detection device according to claim 1, wherein the pressure sensitive sensor includes a rectangular-shaped plane, and
the pair of pressure sensitive portions are provided at corresponding sides of the pressure sensitive sensor.

4. The pressure detection device according to claim 1, wherein the sensor member is configured to change in resistance in a case that a pressing force applied to the pressure sensitive sensor changes.

5. The pressure detection device according to claim 1, wherein the sensor member is the elastic member, and a sensed electrostatic capacitance changes in a case that a pressing force applied to the pressure sensitive sensor changes.

6. An information input apparatus comprising:
a touch panel configured to detect touch coordinates;
a display device;
an optical film group;
the pressure detection device according to claim 1;
a support plate disposed such that the optical film group and the pressure sensitive sensor are interposed between the support plate and the display device; and
a support constituting a sensor structure by coupling the display device and the support plate, the support enclosing the optical film group and the pressure sensitive sensor between the display device and the support plate.

7. The information input apparatus according to claim 6, further comprising:
a chassis including a bottom portion and a side portion that form a recessed portion having an opening,
wherein an edge portion closer to the opening of the side portion supports the sensor structure,
the recessed portion houses the sensor structure, and a gap is formed between the bottom portion and the support plate.

8. The information input apparatus according to claim 6, further comprising:
a chassis including a bottom portion and a side portion that form a recessed portion having an opening,
wherein an edge portion closer to the opening of the side portion supports the sensor structure, the recessed portion houses the sensor structure, and
the sensor structure is unsupported by the bottom portion.

9. The pressure detection device according to claim 1, wherein the pressure detection control unit includes a pressure calculating unit to calculate a pressure value for each of the pair of pressure sensitive portions based on the pressing force.

10. The pressure detection device according to claim 9, wherein the pressure calculating unit stores the pressure value for each of the pair of pressure sensitive portions.

11. The pressure detection device according to claim 10, wherein the pressure calculating unit calculates the pressure change for each of the pair of pressure sensitive portions using the stored pressure value for each of the pair of pressure sensitive portions.

12. The pressure detection device according to claim 1, wherein the pressure detection control unit includes a position calculating unit to determine the coordinates of the freely-selected touch position.

13. A pressure detection device comprising:
a pressure sensitive sensor including
a first insulating layer,
a second insulating layer disposed facing the first insulating layer,
a sensor member formed on a surface of the first insulating layer or the second insulating layer, the sensor member including a pair of pressure sensitive portions located symmetrically with respect to a plane center,
an elastic member disposed at a position to which a touch pressing force is applied, and
a drive electrode and a sense electrode disposed with the sensor member interposed between the drive electrode and the sense electrode;
a pressure sensitive sensor detection unit to detect a first signal generated by the pressing force from the pressure sensitive sensor and output a second signal; and
a pressure detection control unit including
a position calculating unit to determine coordinates of the touched position of the touch pressing force, and
a pressure calculating unit to calculate the touch pressing force based on the second signal from the pressure sensitive sensor detection unit,
wherein the pressure calculating unit detects a pressure change for each of the pair of pressure sensitive portions, and
wherein the pressure calculating unit adds a sign-reversed pressure change of one of the pair of pressure sensitive portions based on the touched position to a pressure change of the other of the pair of pressure sensitive portions, in order to amplify an output.

14. The pressure detection device according to claim 13, wherein the pressure sensitive sensor detection unit converts the first signal from the pressure sensitive sensor into the second signal, and further wherein the first signal is an analog signal and the second signal is a digital signal.

15. The pressure detection device according to claim 13, wherein the pair of pressure sensitive portions are resistive-type pressure sensitive portions.

16. The pressure detection device according to claim 13, wherein the pair of pressure sensitive portions are capacitance-type pressure sensitive portions.

17. The pressure detection device according to claim 13, wherein the sensor member includes a top pressure sensitive layer and a bottom pressure sensitive layer such that an air gap is located therebetween.

18. The pressure detection device according to claim 17, wherein the top pressure sensitive layer is formed covering the drive electrode.

19. The pressure detection device according to claim 17, wherein the bottom pressure sensitive layer is formed covering the sense electrode.

20. A method for performing a pressure calculation control operation in a pressure detection device, the method comprising:
obtaining coordinates for a touched position having a pressing force by a position calculating unit;
measuring a pressure value for a pair of pressure sensitive portions caused by the pressing force by a pressure calculating unit, the pair of pressure sensitive portions located symmetrically with respect to a plane center;
calculating a pressure change for each of the pair of pressure sensitive portions based on the corresponding pressure value for each of the pair of pressure sensitive portions;
determining a closer pressure sensitive portion and a farther pressure sensitive portion of the pair of pressure sensitive portions according to the coordinates of the touched position;
adding a sign-reversed pressure change from the farther pressure sensitive portion to the pressure change detected by the closer pressure sensitive portion by the pressure calculating unit; and
amplifying an output from the pressure detection device using the pressure change including the sign-reversed pressure change.

* * * * *